May 3, 1949. J. O. IVERSON 2,468,756
HYDROGEN FLUORIDE RECOVERY PROCESS
Filed March 24, 1944
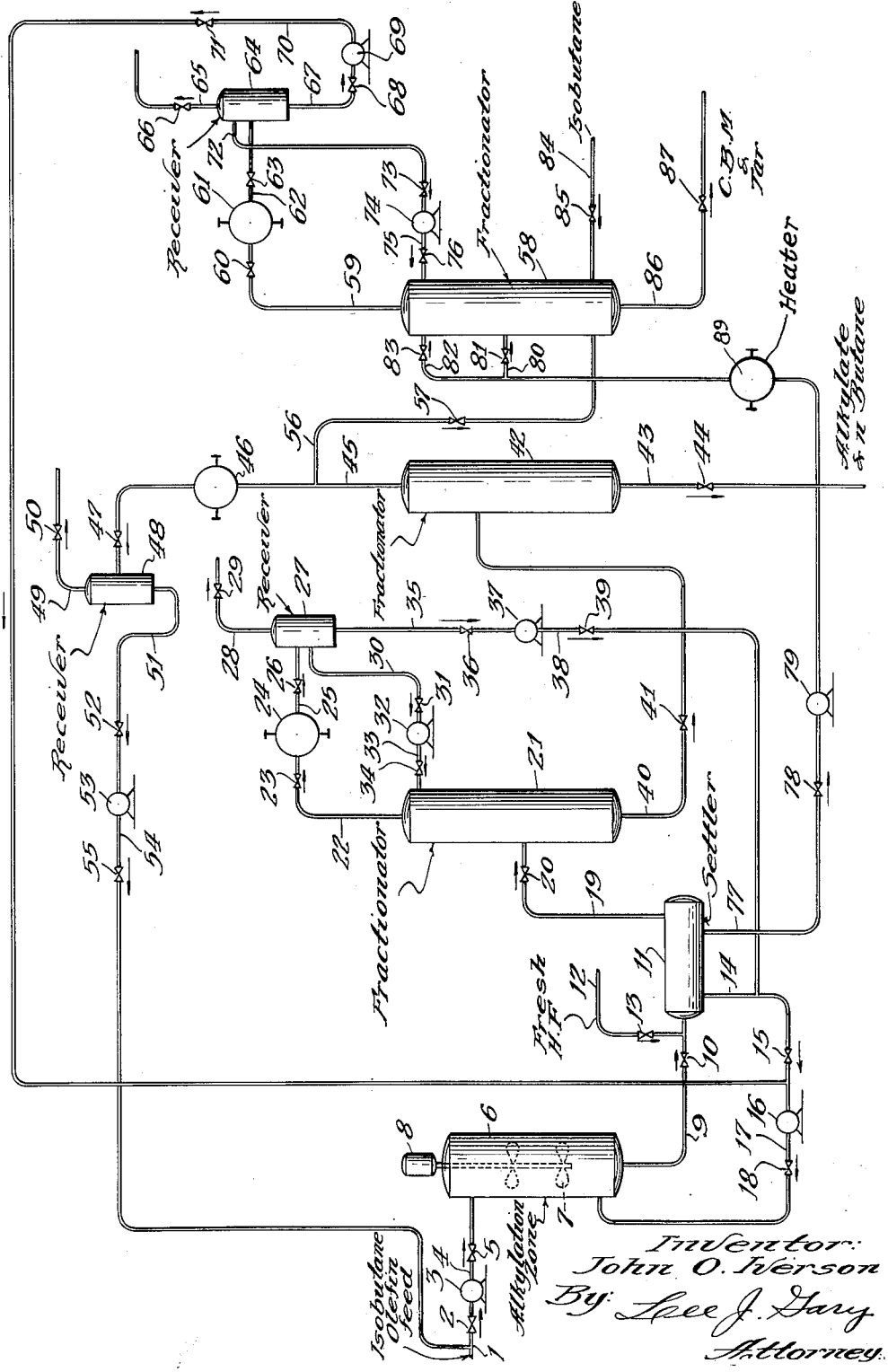
Inventor:
John O. Iverson
By Lee J. Gary
Attorney Patented May 3, 1949

2,468,756

UNITED STATES PATENT OFFICE 2,468,756

HYDROGEN FLUORIDE RECOVERY PROCESS

John O. Iverson, Chicago, Ill., assignor to Universal Oil Products Company, Chicago, Ill., a corporation of Delaware Application March 24, 1944, Serial No. 527,916

10 Claims. (Cl. 260—683.4)

This application is a continuation-in-part of my co-pending application Serial #404,607, filed July 30, 1941, now Patent No. 2,388,918, issued November 13, 1945.

This invention relates to an improved process for the reaction of isoparaffins with olefins in the presence of a hydrogen fluoride catalyst and is more particularly concerned with a method of regenerating the used catalyst.

The reaction of isoparaffins with olefins in the presence of a hydrogen fluoride catalyst is an important method of producing saturated branched chain hydrocarbons having high antiknock values and suitable for use in aviation fuels. In the usual manner of conducting this process, a liquid mixture of isoparaffins and olefins is agitated together with a liquid hydrogen fluoride-containing catalyst until the reaction is complete and the resultant mixture is then allowed to settle in order to separate the hydrocarbon reaction products from the catalyst. Heretofore various complicated schemes have been proposed for the regeneration of the spent catalyst. In this invention, a simplified acid regeneration step is shown which materially reduces the catalyst requirements in the operation and the actual overall cost of the operation.

Broadly the present invention comprises a process for alkylating isoparaffins with olefins which includes the steps of contacting said isoparaffins and olefins with a hydrogen fluoride catalyst under alkylating conditions, separating the hydrocarbon reaction products from the used catalyst, returning at least a portion of said used catalyst to the alkylating zone, recovering purified hydrogen fluoride from another portion of said used catalyst, separately recovering dissolved hydrogen fluoride from the hydrocarbon reaction products and returning the hydrogen fluoride recovered in each of said last two steps to the alkylation zone.

In one specific embodiment, the invention comprises a process for reacting isobutane with normally gaseous olefins in the presence of a hydrogen fluoride catalyst under alkylating conditions, introducing the reaction mixture into a settling zone wherein a substantial proportion of the used hydrogen fluoride catalyst is separated from the hydrocarbon reaction products, returning at least a portion of said used hydrogen fluoride catalyst to the alkylation zone, subjecting the separated hydrocarbon reaction products to fractionation for the removal of dissolved hydrogen fluoride overhead, condensing and returning the hydrogen fluoride to the reaction zone, subjecting the remaining hydrocarbon reaction products to fractionation for the separation of an unconverted isobutane fraction and a motor fuel product, returning said isobutane fraction to the alkylating zone, withdrawing from the previously mentioned settling zone a portion of the used hydrogen fluoride catalyst, fractionating said porting of used catalyst to separate purified hydrogen fluoride from heavy organic materials and a mixture of water and hydrogen fluoride and condensing and returning the purified and dried hydrogen fluoride to the alkylating zone.

Hydrogen fluoride is slightly soluble in hydrocarbons. Therefore, the products from the reaction zone will contain a small amount of the order of 1% of dissolved hydrogen fluoride. The fractionation step following the reaction zone may be operated so as to remove propane, butane, or other light hydrocarbons and also the dissolved hydrogen fluoride. Upon condensation of the overhead stream, the hydrogen fluoride forms a separate layer which may be returned to the alkylation zone and the condensed hydrocarbons are returned to the fractionation step. In order to remove the hydrogen fluoride which has a higher boiling point than either butane or propane, it is necessary to vaporize a relatively large quantity of hydrocarbons. If no propane is to be removed from the reaction products, the hydrogen fluoride may be removed by vaporizing, condensing and refluxing higher boiling hydrocarbons. This step of removing and recovering the dissolved hydrogen fluoride from the product is important because the presence of hydrogen fluoride in the finished product would present a serious corrosion problem, decrease the usefulness of the final product and increase the amount of catalyst that would have to be added as make-up to the process.

Any suitable apparatus or reactor may be employed to contact the hydrocarbon reactants with the liquid catalyst in the reaction zone. It is important that very intimate contact be maintained between the two liquids for a period of time sufficient for the reaction. In general, some form of agitation such as mixing, stirring, etc., is used which forms an intimate mixture or emulsion of the hydrocarbons and hydrogen fluoride. In one particular form of apparatus, as illustrated in the attached drawing, this agitation is obtained by the use of a motor driven stirrer and the reaction products and hydrogen fluoride continuously withdrawn to a settling zone and various fractionating zones wherein the hydrogen fluoride catalyst and unconverted hydrocarbons are separated and recycled to the reaction zone.

The hydrogen fluoride catalyst tends to lose a substantial proportion of its activity after a period of use. This decrease in activity is mainly due to two factors, namely, the contamination of the hydrogen fluoride with organic material and the dilution of the hydrogen fluoride with water. Although it is not known whether the nature of the contamination is a solution effect or a loose chemical combination, it has been discovered that this contaminating organic material can be removed and the activity of the catalyst restored by heating and distilling off the active hydrogen fluoride. A heavy organic material remains after the distillation.

Hydrogen fluoride has a great affinity for water, and it is very difficult to remove the water from the catalyst by any of the ordinary dehydrating methods. Although the incoming charge may be very nearly dry, nevertheless the catalyst will gradually accumulate water. This water will not only reduce the catalyst activity but also makes the hydrogen fluoride more corrosive to the apparatus in which it is handled. It is desirable to maintain the concentration of water in the hydrogen fluoride below about 10%. It is an object of the present invention to provide a simplified method of separating a substantially dry hydrogen fluoride from the heavier high boiling organic materials and a hydrogen fluoride water mixture. This separation is accomplished in a single fractionation step wherein a stream of spent hydrogen fluoride catalyst is introduced and contacted with a stripping medium comprising heated isobutane, the purified hydrogen fluoride and isobutane being removed overhead while organic material and a mixture of water and hydrogen fluoride containing about 35 to 40% of hydrogen fluoride or some other mixture of higher hydrogen fluoride content removed as bottoms.

An important feature of this fractionation step is the use of the heated isobutane stream as a supply of heat for the fractionation and as a stripping medium. If the ordinary methods of heating are employed such as reboilers with steam or other heating fluids, the heavier organic materials tend to form heavy carbonaceous deposits on the other surface of the reboiler thereby decreasing the efficiency of the heat transfer and at some point in the operation, this deposition will be so great that efficient heat transfer can not be accomplished and the operation must be discontinued to remove the carbonaceous deposit. The introduction of a heated stream of isobutane or other light hydrocarbons not only provides the best method for introducing heat into the fractionation zone by direct contact with the spent catalyst, but also supplies additional vapors to strip the hydrogen fluoride from the organic material and mixture of water and hydrogen fluoride.

The accompanying diagrammatic drawing illustrates one specific form of apparatus embodying the features of the invention in which the process may be conducted.

Referring to the drawing, a normally gaseous charge consisting essentially of isobutane, butylenes and butane is combined with a recycled isobutane fraction from line 54 in line 1 and the mixture introduced through valve 2 into charge pump 3 which discharges through line 4 containing valve 5 into alkylation zone 6 which is provided with an agitator 7 driven by motor 8 and the interaction of the olefinic and iso- paraffinic hydrocarbons effected in zone 6, in the presence of hydrogen fluoride introduced through line 17. Generally some means of removing the heat of reaction from zone 6 must be provided, e. g., an internal cooler or a heat exchanger not shown. The emulsion of hydrocarbons and hydrogen fluoride from zone 6 is withdrawn through line 9 and valve 10 to settler 11 wherein hydrogen fluoride settles out as the lower layer. A substantial portion of this catalyst layer is withdrawn through line 14 containing valve 15 by pump 16 which discharges through line 17 containing valve 18 into alkylation zone 6. Fresh hydrogen fluoride is introduced into the system through line 12 containing valve 13. The hydrocarbon layer from settler 11 passes through line 19 containing valve 20 and is introduced into fractionator 21. In this column, the hydrogen fluoride which was dissolved in the hydrocarbon reaction products is separated as an overhead product through line 22 containing valve 23 through condenser 24 and the condensed material directed through line 25 containing valve 26 into receiver 27. In order to remove substantially all of the dissolved hydrogen fluoride from the hydrocarbon products, it is necessary to supply a relatively large quantity of hydrocarbon reflux to column 21. The hydrogen fluoride removed overhead is present in receiver 27 in substantial excess of the solubility in the hydrocarbon present, and, therefore, two layers are formed. The lower hydrogen fluoride layer is withdrawn through catalyst return line 35 containing valve 36, pump 37 which discharges through line 38 and valve 39 into line 14 through which it is recycled to alkylation zone 6. A substantial portion of the upper hydrocarbon layer in receiver 27 is withdrawn through line 30 and valve 31 into pump 32 which discharges through line 33 containing valve 34 and returned as a reflux to column 21. Any gaseous propane which may be present in receiver 27 is removed through line 28 containing valve 29. The bottoms product from fractionator 21 is withdrawn through line 40 containing valve 41 and directed into fractionator 42. From this fractionator, the overhead product consisting mainly of isobutane is withdrawn through line 45 into condenser 46 and the condensed material passed through valve 47 into receiver 48. The isobutane is withdrawn through line 51 and valve 52 into pump 53 which discharges through line 54 and valve 55 into line 1, as hereinbefore set forth. If any light gases are present in receiver 48, they are vented through line 49 and valve 50. A product comprising normal butane and alkylate is withdrawn from fractionator 42 through line 43 containing valve 44.

As previously set forth, the catalyst in the reaction zone gradually becomes contaminated with heavy organic materials and water. In order to maintain the catalyst activity at a substantially constant level, a portion of the catalyst is withdrawn from the system, regenerated and recycled as hereinafter set forth. A portion of the hydrogen fluoride layer separated from the hydrocarbons in settler 11 is withdrawn through line 77 and valve 78 into pump 79 and introduced into heater 89 and thence into fractionator 58 through either of lines 80 or 82 containing valve 81 and 83 respectively. The point of introduction of the spent acid will be dependent upon the extent of stripping desired in fractionator 58. Heated isobutane is introduced into the bottom of column 58 through line 84 containing valve 85 or a portion of the recycled isobutane stream in line 45 may be withdrawn through line 56 containing valve 57 passed through a heating zone not shown and introduced into the bottom of fractionator 58. The overhead product from column 58 consisting mainly of isobutane and purified hydrogen fluoride is withdrawn through line 59 containing valve 60, passed through condenser 61, line 62 and valve 63 and collected in receiver 64 in which again two layers settle out, the upper layer being the hydrocarbon and the lower layer purified hydrogen fluoride. The lower layer of purified hydrogen fluoride is recycled from receiver 64 through line 67 and valve 68 to pump 69 which discharges through line 70 containing valve 71 into line 14 through which it is recycled into alkylating zone 6.

Hydrocarbons separated in receiver 64 are withdrawn through line 72 and valve 73 into pump 74 which discharges through line 75 and through valve 76 into column 58 as a reflux medium. The fractionation in column 58 is controlled by the pressure and temperature therein and the amount of reflux used to provide a hydrogen fluoride product having an acidity in excess of about 90% by weight and ordinarily running about 94 to 96% with a water content ordinarily below about 2% by weight. The amount of reflux employed in acid regeneration zone 58 will be dependent primarily upon the amount of water in the spent acid, higher percentage of water necessitating higher reflux rates. If the water content is small, satisfactory overhead products may be obtained with little or no reflux. The remaining portion of the overhead product will consist of hydrocarbons principally isobutane which can be recycled to the reaction zone together with the purified HF through pump 69. The bottoms product from fractionator 58 is withdrawn through line 86 containing valve 87 and consists primarily of the constant boiling mixture of water and hydrogen fluoride and a tar which is composed of the heavy organic materials present in or formed from the original spent catalyst. The hydrogen fluoride concentration in the constant boiling mixture will ordinarily be around 35 to 40% hydrogen fluoride although it will vary depending upon the particular conditions of temperature and pressure in the column and the amount of heated isobutane introduced as a stripping medium. The constant boiling mixture and tar may be passed through a settling zone wherein the organic material is separated from the constant boiling mixture and the separated fraction may be treated in any manner to recover the desirable constituents.

Acid regeneration zone 58 will ordinarily be quite small since it will be working on only a portion of the hydrogen fluoride being used in the process. It should preferably be constructed of materials that will withstand the corrosive effects of hydrogen fluoride-water mixtures which accumulate and are withdrawn from the column. Copper and silver-lined vessels have been found to be very satisfactory for this purpose.

The preferred range of operating conditions which may be employed in an apparatus such as illustrated and above described for conducting the processes of the invention may be approximately as follows: The pressure at the outlet of charge pump 3 and in the reaction zone may be from about 125 to about 200 pounds per square inch or higher, although it is only necessary to use enough pressure to maintain both catalyst and hydrocarbon substantially in liquid phase. The temperature in the reaction zone may be within the range of about 0° F. to about 150° F. The "space time" defined as the volume of catalyst in the reaction zone divided by the volumes per minute of hydrocarbon feed to the reaction zone may be about 5 to about 80 minutes. Although the ratio of hydrocarbon to hydrogen fluoride in the reaction zone may vary considerably, a suitable ratio will be in the range of 0.5 to 10 volumes of hydrocarbon to one volume of hydrogen fluoride. The ratio of isoparaffin to olefin in the combined feed to a reaction zone may also vary considerably depending upon other conditions but will ordinarily be in the range from about 1 to 10 molecular proportions of isoparaffin for one molecular proportion of olefin.

A specific example of an operation of the process as it is conducted in an apparatus such as illustrated and described is as follows:

The charging stock is a residual BB fraction from refinery gases containing 1.1% of propane, 11% of isobutylene, 17.7% of normal butylene, 39.8% of isobutane and 30.4% of normal butane on a volume basis. This charging stock is under sufficient pressure to be liquid as supplied to line 1 and is discharged from pump 3 at a pressure of about 150 pounds per square inch, combined with an isobutane recycle fraction from line 54 and contacted with a hydrogen fluoride catalyst in reactor 6 which is maintained at a temperature of about 95° F. The ratio of isobutane to olefins in the reaction zone is about 6:1. The reacting materials are withdrawn from reactor 6 through line 9 into settler 11 wherein two layers are formed, the hydrogen fluoride catalyst layer being the bottom layer. The upper hydrocarbon layer is withdrawn and treated as explained in a description of the accompanying drawing. The ASTM octane number of the final product is about 93.

A portion of the spent acid is withdrawn from settler 11, heated to a temperature of about 300° F. and introduced into fractionator 58 wherein it is contacted with a heated stream of isobutane introduced into the lower portion of fractionator 58. The temperature of the isobutane stream is about 400° F. The overhead product from regeneration zone 58 has a total acidity of about 95.9% by weight, water content of 1.2% and the remainder, light hydrocarbons. This acid is recycled to reaction zone 6. The bottoms from regeneration zone 58 consists of tar and a constant boiling HF water mixture containing about 50% by weight of HF. This bottoms product may be treated to separate the HF water mixture from the hydrocarbons and utilized in any manner desirable. By this simple method of acid regeneration, a considerable increase in length of catalyst life is obtained with an appreciable decrease in the amount of make-up acid necessary.

I claim as my invention:

1. A process for the regeneration of a contaminated hydrogen fluoride catalyst containing water and relatively heavy organic material which comprises introducing said contaminated catalyst into the upper portion of a fractionating column, introducing preheated light hydrocarbon vapors into the lower portion of said fractionating column at a temperature sufficient to decompose organic fluorine compounds contained in said organic material and to vaporize hydrogen fluoride therefrom, passing said light hydrocarbon vapors upwardly in countercurrent contact with said contaminated catalyst, simultaneously stripping hydrogen fluoride vapors from said water and said heavy organic material by the upwardly flowing light hydrocarbon vapors, removing overhead from said column said light hydrocarbon vapors and substantially anhydrous hydrogen fluoride vapors, and withdrawing from the bottom of said column a liquid mixture of said heavy organic material, hydrogen fluoride, and water.

2. The process of claim 1 wherein said contaminated catalyst is subjected to a heating step prior to its introduction into said fractionating column.

3. The process of claim 1 wherein said light hydrocarbon comprises isobutane.

4. The process of claim 1 further characterized in that the hydrogen fluoride and water withdrawn from the bottom of said column are in substantially the constant boiling mixture proportions.

5. A process for the regeneration of a contaminated hydrogen fluoride catalyst containing water and relatively heavy organic material which comprises introducing said contaminated catalyst into the upper portion of a fractionating column, introducing preheated light hydrocarbon vapors into the lower portion of said fractionating column at a temperature sufficient to decompose organic fluorine compounds contained in said organic material and to vaporize hydrogen fluoride therefrom, passing said light hydrocarbon vapors upwardly in countercurrent contact with said contaminated catalyst, simultaneously stripping hydrogen fluoride vapors from said water and said heavy organic material by the upwardly flowing light hydrocarbon vapors, removing overhead from said column said light hydrocarbon vapors, condensing the overhead vapors to form a regenerated hydrogen fluoride layer and a hydrocarbon layer, withdrawing said regenerated hydrogen fluoride layer, returning at least a part of said hydrocarbon layer to the upper portion of said column as reflux, and withdrawing from the bottom of said column a liquid mixture of said heavy organic material, hydrogen fluoride, and water.

6. The process of claim 5 wherein said isoparaffin is isobutane.

7. In the alkylation of isoparaffins with olefins in the presence of a hydrogen fluoride catalyst wherein an isoparaffin and an olefin are contacted with hydrogen fluoride in an alkylation zone at alkylating conditions, the resultant reaction mixture is separated into a catalyst phase and a hydrocarbon phase comprising alkylate and unreacted isoparaffin, and a portion of said catalyst phase is recycled to said alkylation zone, and wherein said catalyst phase gradually accumulates undesirable amounts of heavy organic material and water, the improvement which comprises introducing at least a part of the contaminated catalyst phase into the upper portion of a fractionating column, introducing preheated light hydrocarbon vapors into the lower portion of said fractionating column at a temperature sufficient to decompose organic fluorine compounds contained in said organic material and to vaporize hydrogen fluoride therefrom, passing said light hydrocarbon vapors upwardly in countercurrent contact with said contaminated catalyst, simultaneously stripping hydrogen fluoride vapors from said water and said heavy organic material by the upwardly flowing light hydrocarbon vapors, removing overhead from said column said light hydrocarbon vapors and substantially anhydrous hydrogen fluoride vapors, condensing the overhead vapors to form a regenerated hydrogen fluoride layer and a hydrocarbon layer, returning said regenerated hydrogen fluoride to the alkylation zone, returning at least a part of said hydrocarbon layer to the upper portion of said column as reflux, and withdrawing from the bottom of said column a liquid mixture of said heavy organic material, hydrogen fluoride, and water.

8. The process of claim 7 further characterized in that said light hydrocarbon comprises isobutane.

9. A process for the regeneration of a contaminated hydrogen fluoride catalyst containing water and relatively heavy organic material which comprises introducing said contaminated catalyst into the upper portion of a fractionating column, introducing preheated light hydrocarbon vapors into the lower portion of said fractionating column at a temperature sufficient to decompose organic fluorine compounds contained in said organic material and to vaporize hydrogen fluoride therefrom, passing said light hydrocarbon vapors upwardly in countercurrent contact with said contaminated catalyst, simultaneously stripping hydrogen fluoride vapors from said water and said heavy organic material by the upwardly flowing light hydrocarbon vapors, removing overhead from said column said light hydrocarbon vapors and substantially anhydrous hydrogen fluoride vapors, condensing the vapors removed overhead from said column and returning a portion of the resultant condensate to the upper portion of the column as reflux, and withdrawing from the bottom of said column a liquid mixture of said heavy organic material, hydrogen fluoride, and water.

10. The process of claim 9 further characterized in that said preheated light hydrocarbon vapors comprise isobutane.

JOHN O. IVERSON.

REFERENCES CITED

The following references are of record in the file of this patent:

UNITED STATES PATENTS

| Number | Name | Date |
| --- | --- | --- |
| 1,792,234 | Manley | Feb. 10, 1931 |
| 1,924,196 | Miller | Aug. 29, 1933 |
| 2,267,730 | Grosse et al. | Dec. 30, 1941 |
| 2,317,901 | Frey | Apr. 27, 1943 |
| 2,320,629 | Matuszak | June 1, 1943 |
| 2,322,800 | Frey | June 29, 1943 |
| 2,347,317 | Gibson | Apr. 25, 1944 |
| 2,371,341 | Matuszak | Mar. 13, 1945 |